US012737424B2

(12) United States Patent
Almadi

(10) Patent No.: US 12,737,424 B2
(45) Date of Patent: Sep. 15, 2026

(54) MEDIA INTELLIGENCE SYSTEM FOR ADVISORY RECOMMENDATION

(71) Applicant: SAUDI ARABIAN OIL COMPANY, Dhahran (SA)

(72) Inventor: Sabal Almadi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 117 days.

(21) Appl. No.: 18/745,655

(22) Filed: Jun. 17, 2024

(65) Prior Publication Data

US 2025/0384094 A1 Dec. 18, 2025

(51) Int. Cl.
*G06F 16/9535* (2019.01)
*G06F 40/279* (2020.01)

(52) U.S. Cl.
CPC ........ *G06F 16/9535* (2019.01); *G06F 40/279* (2020.01)

(58) Field of Classification Search
CPC ............. G06F 16/9535; G06F 16/9536; G06F 16/9538; G06F 16/9532; G06F 16/951; G06F 16/953
See application file for complete search history.

(56) References Cited

U.S. PATENT DOCUMENTS 9,367,590 B1 6/2016 Chun
10,262,283 B2 * 4/2019 Leidner ............ G06Q 10/06315
10,360,193 B2 7/2019 Sarkar et al.
10,437,871 B2 * 10/2019 Yi ........................... G06F 18/22
10,565,214 B2 2/2020 Pidaparthi et al.
11,257,161 B2 * 2/2022 Sisk ....................... G06Q 40/06
11,321,327 B2 5/2022 Stennett et al.
11,334,949 B2 * 5/2022 Kim ...................... G06F 16/355
11,348,125 B2 5/2022 Rao et al.
11,595,202 B1 2/2023 Stewart et al.
2012/0185544 A1 7/2012 Chang et al.
2014/0046879 A1 2/2014 Maclennan et al.
2018/0165604 A1 6/2018 Minkin et al.
2021/0281569 A1 * 9/2021 Soon-Shiong .......... H04L 63/10
(Continued)

FOREIGN PATENT DOCUMENTS

CN 112420147 A 2/2021
CN 114119251 A 3/2021
(Continued)

*Primary Examiner* — Kris E Mackes
(74) *Attorney, Agent, or Firm* — Vorys, Sater, Seymour and Pease LLP

(57) ABSTRACT

System and methods are disclosed relating media intelligence for a company relating to a topic and/or theme. In some examples, media intelligence parameter data and company historical data can be received, which can be used to generate a subject search parameter. The subject search parameter can include one or more phrases, words, sentences, and/or categories for the topic and/or theme. Data for the topic and/or theme from a number of private and/or media data sources can be queried based on the subject search parameter. The queried data can be aggregated to provide aggregated data. The aggregated data can be filtered to provide filtered data. The filtered data can indicate a position of the private and/or media data sources on the topic and/or theme. A recommendation can be provided for the topic and/or theme using a machine learning model.

20 Claims, 8 Drawing Sheets

(56) References Cited

U.S. PATENT DOCUMENTS

| | | | | |
|---|---|---|---|---|
| 2023/0132532 | A1 | 5/2023 | Rangachar | |
| 2024/0054135 | A1* | 2/2024 | Furlaneto | G06V 30/413 |

FOREIGN PATENT DOCUMENTS

| | | | |
|---|---|---|---|
| CN | 115907837 | A | 4/2023 |
| EP | 4182879 | A1 | 5/2023 |
| WO | 2022133210 | A2 | 6/2022 |

* cited by examiner

MEDIA INTELLIGENCE SYSTEM FOR ADVISORY RECOMMENDATION

FIELD OF THE DISCLOSURE

This disclosure relates generally to media intelligence and more specifically advisory recommendation.

BACKGROUND OF THE DISCLOSURE

Media intelligence uses data mining and data science to analyze public, social and editorial media content. Such systems can synthesize online conversations into relevant information. Media intelligence allows for systematic collection and analysis of large volumes of information from various media sources to gain insights and support decision-making. This allows organizations to measure and manage content performance, understand trends, and drive communications and business strategy. Media intelligence can include software as a service (SaaS). This includes questions about messaging efficiency, share of voice, audience geographical distribution, message amplification, influencer strategy, journalist outreach, creative resonance, and competitor performance.

Media intelligence differs from business intelligence in that it uses and analyzes data outside company firewalls and with data input that is uncontrolled with semi-real time change. Such data can include user-generated content on social media sites, blogs, comment fields, and wikis etc. The data can also include other media data sources, for example, press releases, news, blogs, legal filings, reviews and job postings. Media intelligence can also include competitive intelligence, wherein information that is gathered from publicly available sources such as social media, press releases, and news announcements is used to better understand strategies and tactics being deployed by competing businesses.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

According to an embodiment, a computer-implemented method for providing media intelligence for a company relating to a topic and/or theme can include receiving media intelligence parameter data and company historical data and generating a subject search parameter based on the media intelligence parameter data and the company historical data. The subject search parameter can include one or more phrases, words, sentences, and/or categories for the topic and/or theme. The computer-implemented method can further include querying data for the topic and/or theme from a number of private and/or media data sources based on the subject search parameter, aggregating the queried data to provide aggregated data, and filtering the aggregated data to provide filtered data. The filtered data can indicate a position of the private and/or media data sources on the topic and/or theme. The computer-implemented method can further include providing a recommendation for the topic and/or theme in response to processing the filtered data through a machine learning (ML) model.

According to another embodiment, a system for providing media intelligence for a company for a topic and/or theme can include one or more computing platforms configured to receive media data from a media data source based on subject search parameter and private data from a private data source. The subject search parameter can include one or more phrases, words, sentences, and/or categories for the topic and/or theme. The one or more computing platforms can be further configured to aggregate the media data and the private data to provide aggregated data and filter the aggregated data to provide filtered data. The filtered data can indicate a position of the media data sources and the private data source on the topic and/or theme. The one or more computing platforms can be further configured to provide a recommendation relating to the media intelligence for the topic and/or theme by processing the filtered data through an ML model, causing a process and/or system of a company to be adjusted based on the provided recommendation to adjust a hydrocarbon production.

In a further embodiment, system for providing media intelligence for a company for a topic and/or theme can include memory to store machine-readable instructions, and one or more processors to access the memory and execute the machine-readable instructions. The machine readable instructions can include a first natural language processing (NLP) model to provide a subject search parameter. The subject search parameter can identify one or more phrases, words, sentences, and/or categories for the topic and/or theme associated with a sector. The machine-readable instructions can further include a system interface to aggregate data for the topic and/or theme from a number of different of media data sources and private data sources to provide aggregated data and a second NLP model to filter the aggregated data to provide filtered data. The filtered data can indicate a position of the private and media data sources on the topic and/or theme. The machine-readable instructions can further include an ML model to process the filtered data to provide a recommendation relating to the media intelligence for the topic and/or theme.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
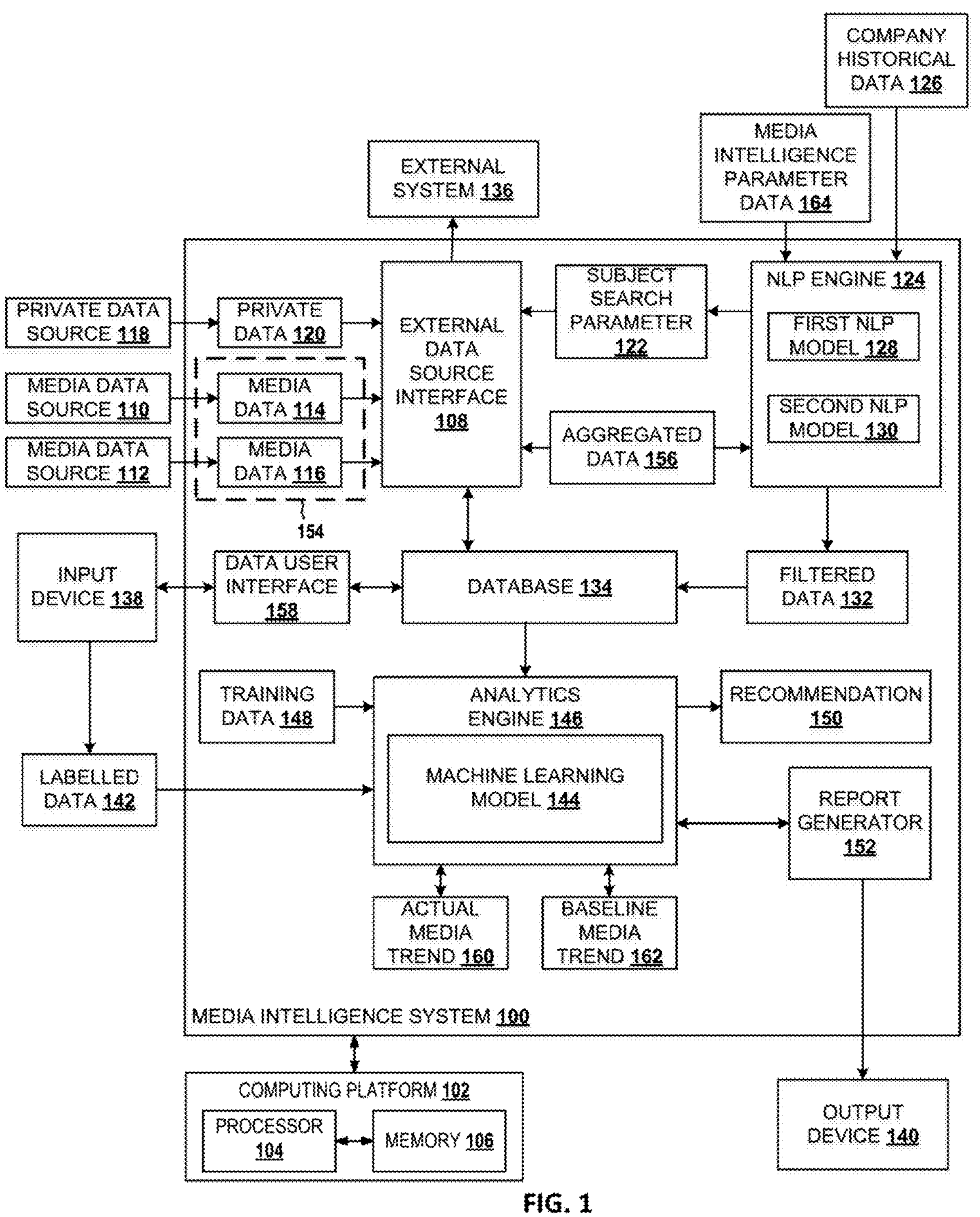
FIG. 1 is a block diagram of an example of a media intelligence system.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments of the present disclosure relate to media intelligence. In a domain of media intelligence, media data sources, such as X (formerly and colloquially known as "Twitter"), news websites, and Bloomberg terminals can be utilized to collect media data, which can then be analyzed for guidance, strategizing, recommendations, advisories, etc. However, it is labor intensive to gather the information and humans are prone to making errors in identifying and selecting sources and processing of the media data from those sources. For example, typically, the media data collected from data sources is manually entered into databases. The data entry process is not only time-consuming but also prone to errors, making it an inefficient method for handling large volumes of media data. Furthermore, in examples where specialized advice is needed, such as in corporate advisory scenarios, the responsibility of gathering and processing of the media data for making recommendations (advisories) often falls on individuals or teams to consolidate and align the media data from the media data sources.

Thus, presently, media intelligence systems and methods (e.g., for gathering the media data and making recommendations) are manual processes and pose a significant challenge in terms of efficiency and potential for human error and bias, which reduces an accuracy by which recommendations (advisories) could be made. Media intelligence (e.g., providing recommendations based on gathered media data) is challenging because of a quality of the media data that is gathered and contextualization (e.g., interpreting and fitting the media data into a relevant framework for understanding). Accordingly, existing media intelligence processes are inconsistent and lack standardization and affect an overall quality of the media data (the intelligence) that was gathered. For example, consider a team analyzing Twitter trends to understand public sentiment about a new product launch. The quality of their analysis (that is by individual and/or team members) depends not only on selecting the right tweets (extraction) but also on correctly interpreting the sentiment and relevance of these tweets (contextualization).

Furthermore, an actual value derived from the media data is relative as it depends on an expertise of people involved, a data source quality, data profiling methods, and processes. A usefulness and applicability of media intelligence is not absolute but can vary based on a number of factors. Thus, a skill level of analysts, the methodologies used for data profiling (e.g., categorizing and analyzing data to understand its structure, content, and potential issues), and processes in place can significantly influence insights that can be gained from the media data. For example, different analysts can interpret of the same news articles differently based on their understanding and experience, and thus lead to varied conclusions about market trends. Moreover, predicting trends from the media data and aligning the predicted trends with objectives is also challenging and impacts recommendations. Forecasting future media trends based on current media data is inherently uncertain. This uncertainty is compounded by the need to align these predictions with long-term strategic goals of an organization. The manual nature of current processes further limits the ability to make accurate, timely predictions. For example, a corporate advisory team trying to predict the impact of a political event on their business strategy may struggle to provide accurate, actionable advice due to a complex, rapidly changing nature of political events and their unpredictable impact on the market.

Accordingly, acquisition (or aggregation), analysis, and application of media intelligence is encumbered by significant obstacles. These include a dependency on labor-intensive manual procedures, requisite for specialized analytical expertise, and intrinsic difficulties associated with forecasting emergent trends. This complexity is further compounded by an unpredictable nature of future developments in a media landscape.

A media intelligence system is disclosed herein. The media intelligence system can be used to automate a process of data acquisition from media outlets (e.g., media data sources), and thus eliminate manual media data sources methodologies that rely on humans for aggregation of media data. In some examples, the media intelligence system can be used to address a challenge of reputation management within media narratives by proactively identifying and responding to potential slanderous content. This functionality enables a formulation of strategic responses. Furthermore, the media intelligence system supplants traditional, manual database methods prone to inaccuracies or outdated information. The media intelligence system can synthesize media landscape analysis into strategic advisories.

For example, instead of manually scouring media outlets, the media intelligence system uses one or more algorithms to automatically gather relevant media data, in some instances, focusing on how these outlets discuss specific topics and/or themes (e.g., hydrogen energy, as an example). In some instances, the media intelligence system is used for reputation monitoring and strategy formulation. For example, the media intelligence system can continuously monitor for defamatory or misleading representations within the media. Upon detection, the media intelligence system can suggest actionable strategies (e.g., recommendations or advisories) to mitigate (or eliminate) reputational damage. The media intelligence system uses enhances a data integrity of aggregated media data by replacing manual databases (e.g., manually inputted or created databases). Thus, the media intelligence system ensures a higher degree of data accuracy and relevance, by constantly updating its repository with current media data.

In some examples, the media intelligence system can be used as an advisory system. For example, the media intelligence system can analyze media trends and narratives and provide an advisory (or strategic recommendation). For example, the media intelligence system can use one or more machine learning (ML) models that have trained on historical media trends and/or narratives for one or more topics and/or themes. By using an ML framework, the media intelligence system can be used to ensure that a company's messaging is not only aligned with a company's objectives but also resonates with a target demographics prevailing media narratives. Thus, the media intelligence system can be used to provide targeted messaging. The media intelligence system can be configured to generate targeted messaging strategies (e.g., recommendations) based on publicly available media data, as well as in some instances private data.

The messaging strategies can be fine-tuned to address a specific preferences and perceptions of distinct stakeholder demographics. These capabilities can be scaled to different customization such by topic, age, culture, personal, or professional affiliations.

In some examples, advisories can be tailored to align with a company's communication goals and specific nuances of a particular media landscape. In some instances, the media intelligence system is geographically customizable. For example, the media intelligence system can recognize variances in media portrayal and public perception in one or more different regions. In yet additional or alternative examples, the media intelligence system can provide region-specific advisories. For instance, for hydrogen energy, the media intelligence system can analyze how Japanese media outlets discuss this topic and suggest communication strategies that are specifically tailored for a Japanese audience.

Accordingly, the media intelligence system can improve an accuracy of a media intelligence process so that more accurate recommendations (advisories) can be provided. Thus, examples herein disclose an improved recommendation system in a realm of media intelligence used by companies, organizations, etc. that delivers more accurate recommendations so that behaviors and/or systems can be tailored and adjusted to meet (or respond to) changes in a particular media landscape.

FIG. 1 is an example of a block diagram of a media intelligence system 100. The system 100 can be used to provide a recommendation 150 based on media data 154 characterizing media content for a theme and/or topic. For example, the recommendation 150 provided by the system 100 can be used to assist decision-makers in forming strategies and/or controlling systems. The system 100 can generate the recommendation 150 that link messages with an organization's strategy to conversations happening or occurring in a specific demographic or geographical area. The recommendation 150 can be used to align (or improve) an organization's communication objectives. By way of example, the recommendation can be a strategic guidance document or set of recommendations focusing on hydrogen.

The system 100 can be implemented using one or more modules, shown in block form in the drawings in the example of FIG. 1. The one or more modules can be in software or hardware form, or a combination thereof. In some examples, the system 100 can be implemented as machine-readable instructions for execution on a computing platform 102, as shown in FIG. 1. The system 100 can be implemented on a computing platform 102. The computing platform 102 can include any computing device, for example, a desktop computer, a server, digital cloud, a controller, a blade, a mobile phone, a tablet, a laptop, a personal digital assistant (PDA), or other types of portable (or stationary) devices. The computing platform 102 can include a processor 104 and a memory 106. By way of example, the memory 106 can be implemented, for example, as a non-transitory computer storage medium, such as volatile memory (e.g., random access memory), non-volatile memory (e.g., a hard disk drive, a solid-state drive, a flash memory, or the like), or a combination thereof. The processor 104 can be implemented, for example, as one or more processor cores. The memory 106 can store machine-readable instructions (e.g., the system 100) that can be retrieved and executed by the processor 104. Each of the processor 104 and the memory 106 can be implemented on a similar or a different computing platform.

The system 100 includes a external data source interface 108 (referred to herein as system interface 108). The system interface 108 can receive or request media data from data streams, which can include internal data sources and external media data sources. The system interface 108 can communicate at different time slots (or concurrently) with the data streams, as disclosed herein, to receive relevant media data. The system interface 108 can in some instances securely connect or communicate with media data sources 110-112 to receive media data 114-116 and in some instances with a private data source 118 to receive private data 120. For example, the private data source 118 can be a computing platform, such as disclosed herein, of an organization or company, and the system interface 108 can retrieve the private data 120 from the computing platform. In some examples, the private data source 118 is a computing platform of a third-party data source (e.g., a consulting firm). For example, the private data source 118 can include company data that is internally collected and archived (e.g., historical data).

Each of the media data sources 110-112 can be managed by a media data provider. There can be an "n" number of media data sources of the media data sources 110-112, wherein "n" is integer value. The media data sources 110-112 can be representative of one or more computing platforms, such as disclosed herein, that store the media data 114-116. Examples media data sources 110-112 can include, but not limited to, information service providers (e.g., that supply information services, including news, financial data, and/or social media content), content distributors (e.g., that disseminate various types of content), data vendors (e.g., provide data relating to financial, news-related, and/or social media to users and/or organizations), media platforms, news aggregators, market data providers, social media networks, information networks, and/or content aggregators. One or more of the media data sources 110-112 providers can function or operate in a respective domain. A domain refers to a specific area and/or category of information each provider can provide. For example, Bloomberg operates in the financial news domain, whereas X operates in a social media domain. Thus, a domain can include a broad area, such as technology, finance, or healthcare, as an example. Sector can refer to a sub-category within a domain, such as software, banking, energy, pharmaceutical, etc.

The system interface 108 can access each media data source 110-112 and/or private data source 118 to receive or retrieve the media data 114-116 and/or the private data 120 based on a subject search parameter 122. The subject search parameter 122 can include one or more phrases, words, sentences, categories, etc. for a topic and/or theme in in a sector, for example, industry sector. The topic and/or theme can be related to (correlated) to a company's services and/or capabilities in a focus area (the sector). In some examples, one or more of the private data sources 118 and/or the media data sources 110-112 can store information in one or more databases. For example, the system interface 108 can identify or receive information relevant to the topic and/or theme relevant to the company's services and/or capabilities based on the subject search parameter 122.

In some examples, the system 100 includes a natural language processing (NLP) engine 124 that can provide the subject search parameter 122 based on company historical data 126 and media intelligence parameter data 164. The media intelligence parameter data 164 can specify one or more parameters for use by the system 100 in providing the recommendation 150 for a user and/or company of the system 100 according to one or more examples, as disclosed herein. The media intelligence parameter data 164 can include data indicating an area of focus for the theme and/or topic, as well as the theme and/or topic. Thus, the media intelligence parameter data 164 can identify one or more parameters for controlling a type of recommendation that is provided as the recommendation 150, as shown in FIG. 1. For example, the area of focus can identify a sector, such an energy sector, and the theme and/or topic can be "hydrogen energy cells." The company historical data 126 can include past advisories, reports, strategic documents white papers, and/or other publications related to the company for the theme and/or topic, and in some instances for the focus area. For example, the NLP engine 124 can employ text mining techniques to extract keywords, phrases, sentences, etc. from the strategic documents, service descriptions, and/or past reports for the topic and/or theme. In some instances, the NLP engine 124 includes a first NLP model 128 that has been trained to identify keywords, phrases, sentences, etc. relevant to a company's goals, the theme and/or the topic. The first NLP model 128 can be trained to identify keywords, phrases, sentences, etc. based on relevant historical company historical data (e.g., for the same company or a number of companies in a similar operating space). In some examples, the system interface 108 can be provided with each topic and/or theme based on a user input at an input device 138, as shown in FIG. 1.

By way of example, if the company uses renewable energy or provides consulting relating to renewable energy, the identified keywords, phrases, sentences, etc. by the first NLP model 128 can include, but not limited to, hydrogen fuel cells, renewable energy policies, green hydrogen production, hydrogen storage technologies innovations in hydrogen technology, market trends in renewable energy, and regulatory changes affecting hydrogen adoption.

For example, the system interface 108 can use an application program interface (API) to access the media data 114-116 from the media data sources 110-112 and the private data 120 from the private data source 118, which can have a particular format (e.g., a standard format, such as XML, JSON, and/or RSS). There can be a respective API for accessing each of the media data sources 110-112 and the private data source 118. By using a separate API or an API that can support communication with different media data sources, the system interface 108 can communicate with multiple media data providers concurrently. In some examples, the media data sources 110-112 use a technology service (e.g., data feed) to provide users with a continuous stream of media data. The technology service can be a software mechanism for delivering real-time or near real-time information from a source to an end user. In some examples, one or more of the media data sources 110-112 includes a database. The system interface 108 can access data from each of the databases, which can contain different types of media data. Thus, the system interface 108 can aggregate the media data 114-116 from any number of media data resources (the media data sources 110-112) and in some instances the private data 120 for further processing, as disclosed herein.

In some examples, the system interface 108 forms a query, such as "hydrogen fuel cell innovations," "green hydrogen market trends," and "renewable energy policies affecting hydrogen." The system interface 108 can submit the query to one or more of the media data sources 110-112 and/or the private data source 118, which in return can provide the media data 114-116 and/or the private data 120. For example, the system interface 108 accesses media data sources 110-112 like news aggregators (e.g., Bloomberg for financial news), social media networks (e.g., Twitter for public sentiment), and market data providers (e.g., MarketWatch for industry reports) to receive data for the topic and/or theme based on the subject search parameter 122. The system interface 108 receives data, which can include articles, social media posts, and market reports relevant or discuss the topic and/or theme. For instance, the system interface 108 can collect or receive tweets discussing new hydrogen projects or news articles about government subsidies for hydrogen technology.

In some examples, the system interface 108 can authenticate the media data 114-116. For example, the system interface 108 can verify each media data source 110-112 and/or author to ensure that the information is from a credible and reputable origin. For example, the system interface 108 can check each media data source 110-112 against a list of known, credible sources. For online data, this can involve verifying a URL against a database of trusted websites or checking digital certificates to ensure the media data 114-116 is coming from a legitimate site. For the media data 110-112 that includes authorship information (like research papers or news articles), the system interface 108 can cross-reference an author's name with databases of known experts, journalists, or authors. Digital signatures or author IDs (e.g., ORCID for researchers) can be used for verification by the system interface 108 in some instances. In some examples, the system interface 108 can use NLP of the NLP engine 124 to analyze content for signs of reliability and accuracy. The system interface 108 can check for consistency of information with known facts, presence of citations, and use of language that indicates expertise or professionalism through use of NLP. The system interface 108 can validate a timestamp to ensure that information is current or relevant to a time period of interest. For example, when the media data 114-116 is collected, the system interface 108 can record a timestamp indicating when the media data 114-116 was created or last updated. For web-based data, the system interface 108 can evaluate the publication date on a webpage or metadata of a digital document. The media data 114-116 and in some instances the private data 120 can be under access control validation to ensure that only authorized users can access or modify such data, and thus maintain its integrity and prevent unauthorized use or tampering. Accordingly, the system interface 108 can aggregate data from a number of media data sources 110-112 and private data sources to provide aggregated data 156.

In some examples, the system interface 108 can provide the aggregated data 156 to the NLP engine 124. The NLP engine 124 can include a second NLP model 130 that has been trained to filter the aggregated data 156 to provide filtered data 132. second NLP model 130 The second NLP model 130 can provide the filtered data 132 based on data from a number of different media data and private sources, such as disclosed herein. The filtered data 132 can be processing using ML techniques, as disclosed herein, to get insights that can be used to conclude results (provide the recommendation 150). The results can reveal trends and/or content that can be utilized to better understand a position of media on the topic and/or theme. The filtered data 132 can include information indicating a position of a data source (or as identified on the data source) on the topic and/or theme. Thus, the filtered data 132 can include information characterizing a stand or viewpoint of a media and/or private data source, a person, an entity, a country, etc., on the topic and/or theme. For example, the filtered data 132 can include information on the topic and/or theme, such as a perception, facts, statistics, regulation, share of voice (SOV), media sentiment, etc.

For example, the second NLP model 130 can use NLP techniques to analyze a text of a tweet, article, video transcript, etc. of the aggregated data 156 (corresponding to one of the media data 114-116). The second NLP model 130 can be trained based on algorithms such as VADR or TextBlob to determine sentiment (e.g., positive, negative, or neutral) of a text or information for the topic and/or theme based on the aggregated data 156. Thus, the second NLP model 130 can be trained on labeled sentiment data relevant for the topic and/or theme. The second NLP model 130 can output a polarity score ranging from −1 to 1 (or another suitable scale) to indicate media sentiment. In some examples, weights can be assigned based on factors such as source credibility, a reach of an article, a number of shares, and/or an influence of an author for determining media sentiment. Thus, the media sentiment computed can be a sentiment score of a tweet, article, video, or other item in the media on whether the context is positive, negative, or neutral on the topic and/or theme. In some examples, the second NLP model 130 can assess how an audience perceives the sentiment through engagement metrics (likes, shares, comments, retweets). This can be incorporated by adjusting the sentiment score based on the volume and nature of interactions. The sentiment score can be weighted more heavily for content that receives high engagement from credible or influential sources. In some examples, the second NLP model 130 can use a fact-checking algorithm to validate content. Example fact-checking algorithms can include, but not limited to, ClaimBuster, Fact Extraction and Verification (FEVER), Snopes API, Truth Goggles, Google Fact Check Tool, Factmata, Veracity, and Hoaxy. Sentiment scores of articles with verified facts can be given higher weight compared to those with disputed or unverified claims.

In some examples, the NLP engine 124 can compute a SOV score for the topic and/or theme in resulting volume and impact in media. The NLP engine 124 can count a number of mentions or articles related to the topic and/or theme across different media platforms (social media, news sites, blogs, etc.). The NLP engine 124 can measure an extent of coverage in terms of reach (audience size), impressions, and/or engagement (likes, shares, comments). The NLP engine 124 can consider metrics like the number of views, shares, comments, or a Klout score of influencers mentioning the topic and/or theme. The NLP engine 124 can calculate the SOV score by dividing a volume and impact of mentions of the topic and/or theme by a total volume and impact of mentions of all topics in a same category. The NLP engine 124 can assign different weights to various sources based on their influence and reach to refine the SOV score.

For example, if the topic and/or theme is "hydrogen fuel cells" the filtered data 132 can indicate advocacy for use of hydrogen fuel cells as a clean energy source, skepticism about an efficiency of hydrogen fuel cells, analysis relating to an economic impact of hydrogen fuel cells, positive and/or negative treatment of hydrogen fuel cells (e.g., relating to their use, for example), discussion of technological advancement in hydrogen cell development, comparison with other energy sources, such as fossil fuels or electric batters, or other positional information on hydrogen fuel cells. In yet additional or alternative examples, the filtered data 132 for the "hydrogen fuel cells" topic can include facts on hydrogen in the last six months and related expansions, statistics on hydrogen fuel cells (e.g., volume of hydrogen fuel cells produced and sold over the period of six months, market price, etc.), media sentiment on hydrogen fuel cells, and share of voice (e.g., how much the media and online platforms cover hydrogen fuel cells over a given period).

The media intelligence system 100 can further include a database 134, or communicate with the database 134. In some examples, the database 134 is referred to as a data lake as it is a repository for the filtered data 132. The NLP engine 124 (or the system interface 108) can convert the filtered data 132 into a standard data format for storage at the database 134 for further processing, as disclosed herein. Standard data formats can include proprietary software formats, such as those used by products such as Microsoft Office (e.g., MS Word, Rich Text Format, and MS Excel) or statistical analysis in social science (SPSS). Thus, the database 134 can include information from various data sources, such as the private data 120 (e.g., which could be restricted or confidential data that is accessible to only certain users or employees, or under certain conditions) and the media data 114-116 (e.g., which could be available to anyone, in some instances through an account with a data provider, such as Bloomberg).

In some examples, the database 134 can store a data profile for one or more data sources, such as the media data sources 110-112. The data profile can be used to ensure data used for data analytics, as disclosed herein, is from a credible source and thus ensure data integrity. For example, the data profile can identify a source, a time, a data delivery means, and other information that can be mapped to the filtered data 132. The data profile can be retrieved by the system interface 108 and evaluated to confirm that information within the filtered data 132 is from a credible source. For example, the system interface 108 can check a source of information (e.g., "Yahoo Finance") to ensure that the system 100 is using media data from a recognized and authoritative source. In some examples, the system interface 108 can evaluate the timestamp indicating when the media data was last received or updated. If the system interface 108 determines that the media data is outdated based on the timestamp, the system interface 108 can request updated media data.

In some examples, the filtered data 132 can require validation by a subject matter expert (SME), or an external system 136. The system interface 108 can identify media data of the filtered data 132 that requires validation by the external system 136, which is referred to as flagged media data. Flagged media data refers to any media data from the filtered data 132 that has been identified by the system interface 108 as potentially requiring validation. The system interface 108 can continuously monitor the filtered data 132 against a threshold, a range, or a geographical location (or boundary). The system interface 108 can use a notification system to send flagged data to the SME or the external system 136 for validation. The SME or the external system 136 can review the flagged media data to determine if the flagged media data is accurate and relevant. The SME or the external system 136 can confirm that the flagged media data is valid (or not). The SME or the external system 136 can check a context, source credibility, and relevance to the topic and/or theme associated with the flagged media data. For example, the SME or the external system 136 can receive a media sentiment score of +0.92 for hydrogen fuel cells. The SME or the external system 136 can investigate the articles and posts contributing to this score, checking for recent news, announcements, or events related to hydrogen fuel cells. Thus, the flagged media data can include the media sentiment score of +0.92, along with the associated articles and social media posts that contributed to this score.

Based on the review, the SME or the external system 136 can either validate the flagged media data as correct or make necessary adjustments. If the flagged media data is deemed accurate, it is confirmed; if errors or irrelevances are found, adjustments can be made. For example, if the SME or the external system 136 discovers that a major breakthrough in hydrogen fuel cell technology was announced, justifying a high sentiment score, The SME or the external system 136 can validate the score as correct. Alternatively, if the high sentiment was due to unrelated news mistakenly tagged with hydrogen fuel cells, the SME or the external system 136 can correct this by removing or reclassifying the media data.

The SME or the external system 136 can provide feedback to the system interface 108 based on the validation, which can then use the feedback to adjust the threshold, the range, or the geographical location (or boundary) to improve an accuracy of the system 100. In some examples, if the feedback indicates that certain data (or information) within the filtered data 132 should be excluded or removed, the system interface 108 can remove that information based on the feedback. For example, the SME or the external system 136 can determine that a high sentiment score correlates with significant technological announcement. The SME or the external system 136 can communicate to the system interface 108 feedback data to adjust the threshold, the range, or the geographical location (or boundary). The feedback data can include insights and recommendations provided by the SME or the external system 136 based on the review of the flagged media data. For example, the feedback data can indicate a value for adjusting the threshold (e.g., sentiment score threshold). As an example, the system interface 108 can use the feedback data to only flag sentiment scores above +0.95, in some instances, unless accompanied by certain key words indicating major news.

By way of further example, the system interface 108 can evaluate the SOV and/or the media sentiment score to a corresponding threshold (or range). If the SOV and/or the media sentiment score exceeds the threshold (or is outside of the range), the SOV and/or the media sentiment can be flagged for validation by the external system 136. In some examples, the system interface 108 can validate information of the filtered data 132 that originates or is outside of a defined geographical location. For instance, if the media sentiment score exceeds the threshold (or is outside the range), or if information within the filtered data 132 originates from an unexpected geographical location, it can be identified as flagged media data and sent to the external system 136 or the SME for validation.

In some examples, the system 100 includes a data user interface 158. The data user interface 158 can be used to enable users to add relevant data and insights about the topic and/or theme that is under consideration. For example, the user can use the input device 138 to provide user data, which can be stored in the database 134 as part of the filtered data 132. The user data can provide context and background on the topic and/or theme. In some examples, the user data include recent survey results, current events, or latest research findings for the topic and/or theme. By incorporating the user data, the system 100 can make more accurate and informed recommendations. In some examples, the data user interface 158 can provide a graphical user interface (GUI) that can be rendered on an output device 140 and used by the user to input the user data.

In some examples, the user (e.g., the SME) can review collected data (e.g., historical media data, private data and/or filtered data). For example, the user can collect (and/or use collected) data on hydrogen fuel cells, including research studies, market trends, and sentiment analysis. The user can review the collected data and provide a recommendation for the topic and/or theme. For instance, the user can recommend focusing on specific research directions or highlight emerging market opportunities. The user can provide recommendations as labelled data 142 for training an ML algorithm to provide an ML model 144, such as a supervised ML algorithm. The system 100 can include an analytics engine 146, which can use the labelled data 142 and training data 148 to train the ML model 144. The training data 148 can include historical media data, private data and/or filtered data.

The ML model 144 can process the filtered data 132 to provide the recommendation 150. In some examples, the analytics engine 146 can discern or identify an actual media trend 160 in the filtered data 132. The actual media trend 160 can be analyzed relative to a baseline media trend 162 to determine whether the media trend for the topic and/or theme is deviating from the baseline media trend 162. The actual media trend 160 can represent a current state of media coverage, sentiment, and/or discussion surrounding the topic or theme. The actual media trend 160 can be derived by the analytics engine 146 (in some instances the ML Model 144) from the filtered data 132, such as news articles, social media posts, and other media sources. Thus, the actual media trend 160 can characterize how the topic and/or theme is currently being perceived and discussed in the media. The baseline media trend 162 can represent a historical reference point that represents a usual state or typical behavior of media coverage and sentiment for the topic and/or theme over a certain period. For example, the analytics engine 146 can compute the baseline media trend 162 using historical media data (e.g., in some instances including or using historical filtered data), for example, such as past news articles, research studies, market analyses, and social media posts over the last few years. The analytics engine 146 can analyze the historical data to establish patterns, common themes, typical sentiment (positive, negative, neutral), and/or a frequency of mentions. The analytics engine 146 can use the historical data to calculate average sentiment scores, frequency of mentions, and common topics/themes over time. For example, the baseline media trend 162 can show that hydrogen fuel cells generally receive neutral to positive coverage, with a steady mention frequency and occasional spikes during major announcements or breakthroughs. The system 100 can continuously collect and analyze real-time data on hydrogen fuel cells from various media sources. The analytics engine 146 can compute the sentiment scores, frequency of mentions for the topics/themes. The analytics engine 146 can use and/or communicate with the NLP engine 124 for sentiment analysis. The analytics engine 146 can compare the current (actual) media trend 160 with the baseline media trend 162. The analytics engine 146 can identify any deviations, such as a sudden increase in negative sentiment, a spike in mentions due to a recent breakthrough, or a shift in focus to new research areas or market opportunities.

The ML model 144 can be provide the recommendation 150 based on the analysis of the actual media trend 160 and the baseline media trend 162. For example, if the sentiment has turned negative, the ML model 144 can provide the recommendation 150, which indicates to stakeholders in the hydrogen fuel cell industry to launch a press-release (PR) campaign to address the environmental concerns. This might include publishing new research findings that show advancements in green hydrogen production methods. If the actual media trend 160 shows a new emerging market opportunity, such as increased interest in hydrogen fuel cells for heavy-duty transportation, the ML model 144 can provide the recommendation 150 that suggests focusing research and development and marketing efforts in that area. In some examples, if certain influential media outlets or authors are driving the negative sentiment, the ML model 144 can provide the recommendation 150 indicating that the company should engage with these sources to provide them with accurate information and positive case studies.

In some examples, the recommendation 150 can be used to adjust a process and/or system of a company to adjust a hydrocarbon production, or hydrogen fuel cell use. The company can implement technologies that reduce emission and environmental impact based on the recommendation 150. In some examples, the company can transition to cleaner fuels or use carbon capture storage (CCS) technologies based on the recommendation 150. In some examples, the recommendation 150 can be used to optimize production processes to minimize waste and energy consumption. In yet further examples, the recommendation 150 can be used to expand a use of hydrogen fuel cells in various applications, such as transportation, power generation, and industrial processes. In some examples, the recommendation 150 can be used to optimize operational parameters in hydrocarbon production, such as valve settings, flow rates, temperature, and pressure to enhance efficiency, reduce emissions, or improve safety. For example, the recommendation 150 can be a suggestion to reduce emissions and improve efficiency by optimizing settings and flow rates.

The recommendation 150 can be received by a report generator 152, which can use the filtered data 132 and the recommendation 150 to provide a report that can be displayed on the output device 140. In some examples, the system 100 can provide a corresponding report for a given focus area. For example, a focus area may be the energy sector specifically related to "hydrogen fuel cells." For example, the report can include outlet Intelligence (news stories about hydrogen along with outlet positioning or typical agenda, agenda both on topics of relevance to the country, and or industry developments), journalist positioning (on industry developments and agenda), corporate direction (company direction, positioning, purpose, project details on the given theme and/or topic), expert intelligence (intel from consultants, experts in a domain on geopolitical, energy, and industry events), and an advisory (final advisory on positioning & key messages supported by intelligence), which can correspond to the recommendation 150.

For example, for advisory on hydrogen, the system 100 can provide a summary of findings (a report), which provides an overview of key insights derived from different intelligence sources, and thus provide a snapshot of a current hydrogen landscape. The report can include an advisory (recommendation). For example, the report can include outlet intelligence section, a journalist positioning section, a corporate direction section, an expert intelligence section, and an advisory section. The outlet intelligence section can provide analysis of news stories about hydrogen, highlighting how different media outlets are positioning the topic, and identify prevailing agendas or themes in media coverage, both in relation to specific countries and the broader industry. The journalist position section can provide information and insights into how individual journalists or influential commentators are discussing hydrogen and related industry developments. This could include perspectives on policy, market trends, or technological advancements in the hydrogen sector. The corporate direction section can specify how other companies are positioning themselves regarding hydrogen and/or details on corporate strategies, purpose, or specific projects related to hydrogen, providing a sense of the industry's direction. The expert intelligence section can include input from consultants and domain experts on geopolitical, energy, and industry-specific events affecting the hydrogen sector, and in some instances, analysis of how these events might impact market dynamics, technology development, or regulatory landscapes. The advisory section can provide a final advisory or one or more strategic recommendations on positioning and key messages that a company should adopt in relation to hydrogen. The advisory can cover aspects like communication strategies, potential investment areas, partnership opportunities, and/or response to regulatory changes. In some examples, the advisory can be tailored to specific stakeholders within the organization, such as executives, research and development teams, marketing departments, or investor relations.

The analytics engine 146 can include the following attributes: correlation, automated contextualization based on historical contextualization, artificial intelligence and ML (e.g., supervised AI). The ML model 144 uses machine learning algorithms to identify actual report data, keep trends of data format and plurality from each data feed and actual data feed generator, and be able to predict future news based on similar trends. The ML model 144 can also predict and provide advisory based on previous advisory results that are aligned with strategy. Through ML, the system 100 can monitor data streams and based on defined flags it employs anomaly and ordinary (e.g., similar) based monitoring in defining the different data streams position on a subject. By employing data analytics and data mining technologies, the system 100 is able to discover position, learn and establish trends of position to data source, model communication patterns and create baseline behavior, and map to the baseline strategy. Once the system 100 concludes the learning phase, the system 100 is able to detect any deviation from the baseline.

In some examples, depending on event context, the system 100 flags current position and critical changes on position from the different data streams. The AI/ML model can capitalize on the different data streams feed and adopt the supervised ML model. This proposed model will superimpose the different data stream feeds to be carried out utilizing supervised ML methods such as but not limited to Naïve Bayes, Decision Tree, Random Forest, K-Nearest Neighbors (KNN), Support Vector Machine (SVM), and Logistic Regression. The model testing method is programmed to scan, detect, and filter in supervised ML. The test function can be based on considering an input from different data sources as defined in the system 100. Data source that does not have a context on the position that is being tested will be dropped from the cycle run for test. However, it will be reconsidered in the subsequent cycle run as there may be newly collected data from the data stream source that has a position on the subject.

For example, for model testing, data is first gathered. Then the data sources are ensured considering the entity that is being assessed (an entity can be a company), the different data source stream feed to a central data management device, relying up reading on specific topics in the data feed (example hydrogen energy) and or finding new topic being addressed by the data feed, and group and cross reference from the data feeds to identify position on specific topics. Then the baseline reference considers the baseline strategy on specific topics and position, trended data position on specific topic, and a test strategy, environment and expected results (what and how) as an example.

| # | Test Strategy | Test Environment | Expected Results |
|---|---|---|---|
| 1 | Gathering and Collecting data Import from file/database/internet Filtering (conditions) Deploy into a useful program e.g., Python | Computing Platform systems, system databases | Provide data that can be tested in the proposed model. Focus on data that can be detected in the ML program |
| 2 | Test the ability of collecting data from the data source System Interface as defined in 108 Find position Get the accuracy in % (missed/detected) Accept and reject the model <90% accuracy (the 90% is configurable) | Computing Platform systems, system databases | Position on specific topics based on the same standard format are collected in real-time with time stamps to ensure it can be utilized for cross examination. |
| 3 | Time Sync of all systems and data feeds based on computing clocking system | Computing Platform systems, system databases based on a master time sync source based on Network Time Protocol (NTP) that allows the synchronization of system clocks. | Collected data and computed data are based on the same time stamp |
| 4 | Frequently test the ability of the receiving data feed from the different data stream | Test Computing Platform systems, system databases | Test cycle and scoring system performance of data source feeder |
| 5 | Measuring data in terms of Scale (Low, Medium, High) Time processing Accuracy | Computing Platform systems, system databases | Amount of data Data quality |

Then data modeling and synthesis can be implemented. Utilize program language Natural Legal Language Processing (NLL) to identify exact positions on a specific topic. This includes correlating to the Strategy as well as trended position on the specific topic. The computing platform utilizes different models for the purpose of data cleaning. For example, Python programming language can be used in this model. Pandas is a library written in Python that is typically utilized for the purpose of data cleaning and analysis by data scientists. Sklearn is a Python machine learning library. It offers classification, regression, clustering, and dimensionality reduction via a consistent interface. The modeling approach will be as follows utilizing the datasets: used for this model as shown: Loading the libraries, Loading the dataset, Select the feature and the label, Split the dataset to train and test sets, Vectorized the texts in the dataset, Modeling Using the ML methods one method may be selected for this purpose: Modeling using Naïve Bayes, Modeling using Decision Tree, Modeling using Random Forest, Modeling using K-Nearest Neighbors (KNN), Modeling using Support Vector machine (SVM), Modeling using Logistic Regression, and Comparing the supervised models based on the time and accuracy.

Then data reporting and advice can be provided. Utilize data reporting tools that can feed from the data modeling and synthesis collected data. These tools may be based on native Natural Legal Language Processing (NLL) reporting capabilities (example; ChatGPT). Additional reporting tools for businesses may be considered such as Hives, Octoboard, Power BI, ProWorkflow, Tabeleau, Zoho Analytics, among others.

Accordingly, the system 100 can be used to automate data gathering and analysis. For example, Instead of manually searching for information, the invention automatically collects data from various data sources. The system 100 employs machine learning algorithms to analyze this data, identifying key themes, sentiment trends, and the overall narrative surrounding hydrogen energy. The system 100 can be used to address reputational challenges. The system 100 can be used to monitor for slander or misinformation. For example, the system 100 can be used to actively scan for reputational slander or misinformation within media reports about hydrogen energy, which could adversely affect the company's image or the public perception of hydrogen energy. The system 100 can suggest courses of action or communication strategies to counteract any negative perceptions or misinformation, ensuring a balanced and accurate representation in the media. In some examples, the system 100 not only gathers and analyzes data but also provides strategic advisory based on the media landscape. For example, the system 100 can be used to consider how hydrogen is being discussed in various regions and/or demographics. Recognizing that media coverage and public perception might vary across these regions and/or demographics, the system 100 can be used to tailor recommendations to fit specific demographics or regional nuances. Furthermore, the system 100 can be used for targeted messaging and strategy alignment. The system 100 can be used to link strategy with media trends. For example, by correlating the company's communication objectives and strategy with the media trends identified, the system 100 can be used to create messaging that resonates more effectively with a target audience. The system 100 can output one or more targeted messaging strategies that can be aimed at different stakeholder groups (e.g., domestically and/or internationally), based on an understanding of a media landscape and public sentiment, both current and historically, in some instances.

By way of further example, if there is a significant development in the energy sector, such as a shift towards renewable energy, the system 100 can be used to analyze how this trend is being discussed in the media. The system 100 can be used to provide insights on public sentiment, media biases, or misinformation. Using this information, a petroleum company's public affairs team can develop communication strategies that effectively address these narratives, align with the company's stance on renewable energy, and can be tailored to various stakeholder groups. The system 100 can also identify key areas of public concern or interest, such as environmental impact or innovation in energy technology. This information can guide advocacy teams in their outreach and engagements and inform executive management in their strategic planning and public communications.

Thus, the system 100 can be used as a tool by a company to manage its media relations, shape its public advocacy efforts, and provide more informed executive decisions. The system 100 provides advanced data analysis, offers strategic guidance for public affairs, advocacy teams, and executive management. By aggregating and interpreting complex media datasets, the system 100 can be used to inform decision-making processes, and supports the development of targeted communication and advocacy strategies. The system 100 equips the company with actionable insights for effective engagement in its media and public relations endeavors.

By way of further example, during a data generation phase, a model input can be provided. The company communication strategy on the subject of hydrogen can be received. The company's historical and latest media data on hydrogen can be received. This will be in the form of a database of press releases, social media content, decision makers interviews. This database will be a feed to ML/AI model. The collected historical and latest media data on the Hydrogen of different related entities can be received; for example peers or competitor companies. The system 100 can also receive collected latest data on selected entities with policies and regulations on Hydrogen. Next, the system 100 can implement database formation. For example, feeds from model input are tabulated into a database on a server, virtual server, or the Cloud. The tabulated data will include data source, entity, time and date, position, and meta-data for each tabulated data. This can include the data source, format, classification and sensitivity level, etc. Then, the analytics engine 146 can implement data correlation of the different collected data is processed. The output of the data can be utilized to identify similarities and differences between the collected data and the policies data and the company strategy. The output of the data can be fed into a database that keeps historical data and is updated semi-real time. The tabulated data can include data source, time and date, position, policy, compliance, deviation, and meta-data for each tabulated data. This can include the data source, format, classification and sensitivity level, etc. The data can be fed into an ML/AI selected models at least two different models. The output of the models can be superimposed to form the final conclusion on the company position on Hydrocarbon. A database that keeps historical data can be updated semi-real time. The tabulated data will include data source, time and date, position, policy, compliance, and deviation.

Figure 2:
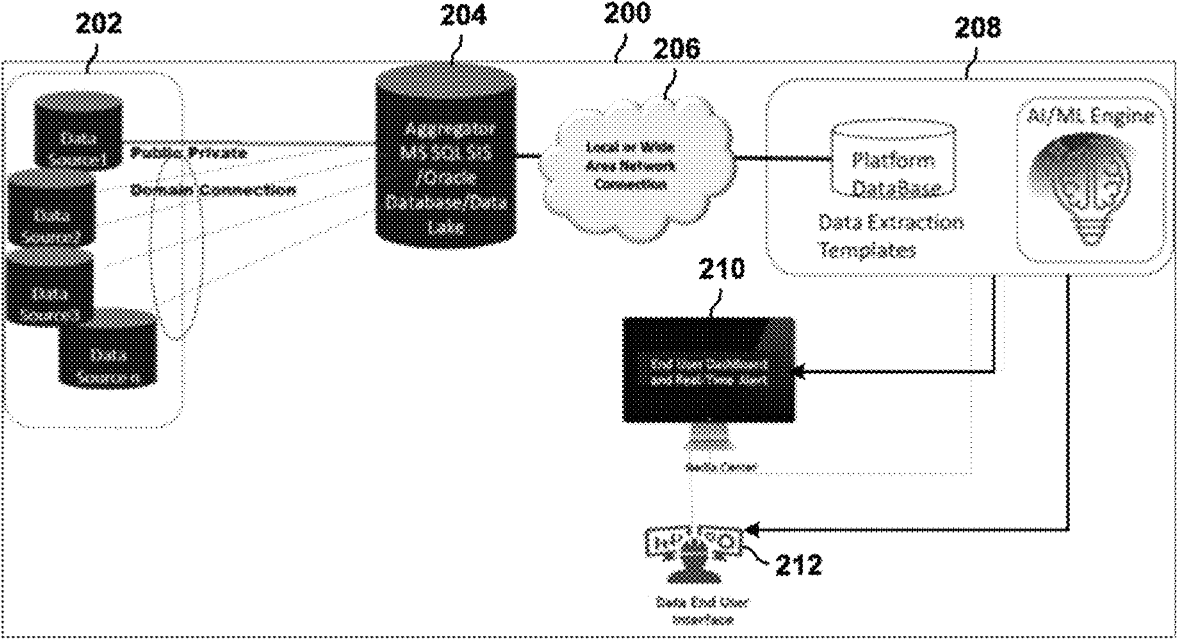
FIG. 2 is an example of a media intelligence architecture.

FIG. 2 is an example of a media intelligence architecture 200. The architecture 200 includes data sources 202 that can correspond to the data sources, as shown in FIG. 1. Thus, reference can be made to one or more examples of FIG. 2 in the example of FIG. 1. The architecture 200 includes an aggregator 202 for storing filtered data, such as the filtered data 132, as shown in FIG. 1. The filtered data 132 can be fed over a network 206 to an AI/ML algorithm 208, such as the ML model 144 and processed to provide an advisory and/or report, as described herein. The AI/ML algorithm 208 can provide a report, which can be rendered on output device 210, as shown in FIG. 1. In some examples, the report can be provided to a data end user interface 212, and rendered on display for a user.

Figure 3:
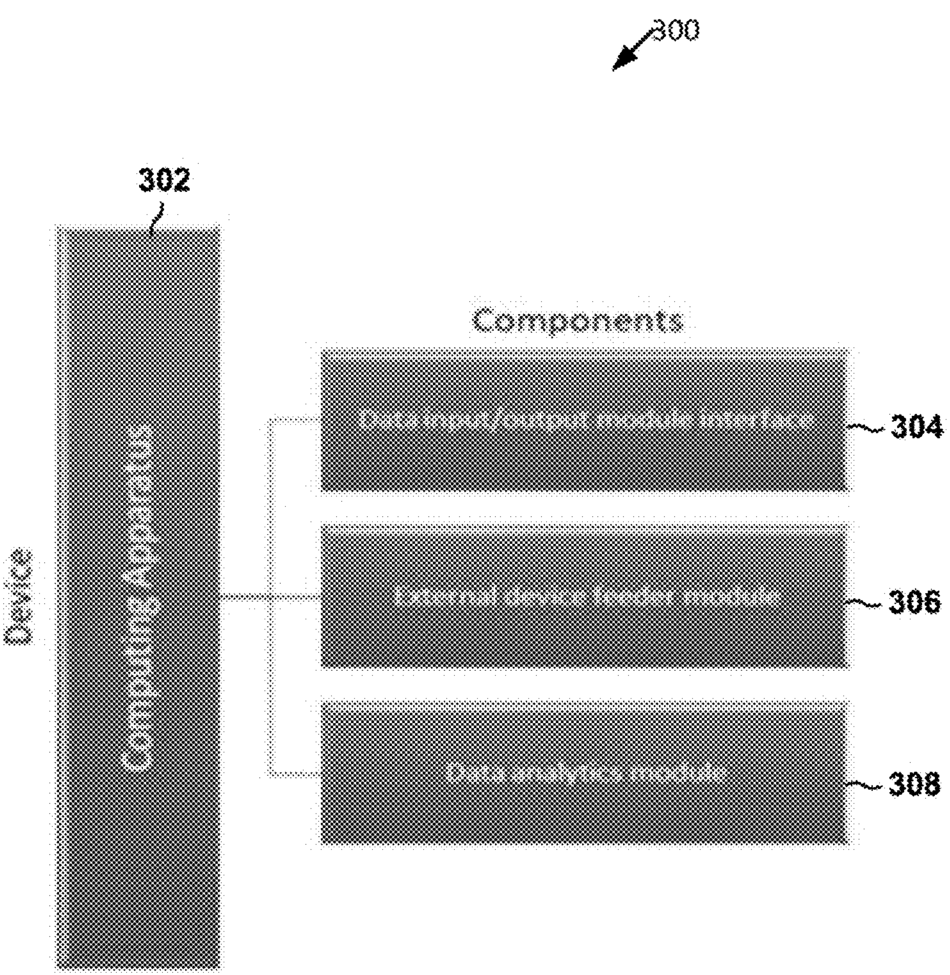
FIG. 3 is an example of a block diagram of a media intelligence computing system.

FIG. 3 is an example of a block diagram of a media intelligence computing system 300. The system 300 includes a computing apparatus 302, a data input/output module interface 304, an external device feeder module 306, and a data analytics module 308. The computing apparatus 302 can correspond to the computing platform 102, as shown in FIG. 1. Thus, reference can be made to one or more examples of FIGS. 1-2 in the example of FIG. 3. The data input/output model interface 304 can correspond to the system interface 108, as shown in FIG. 1. The external device feeder module can correspond to the data user interface 158, as shown in FIG. 1. The data analytics module 308 can correspond to the analytics engine 146, as shown in FIG. 1. The system 300 can be used to provide a report and/or an advisory according to one or more examples, as disclosed herein.

Figure 4:
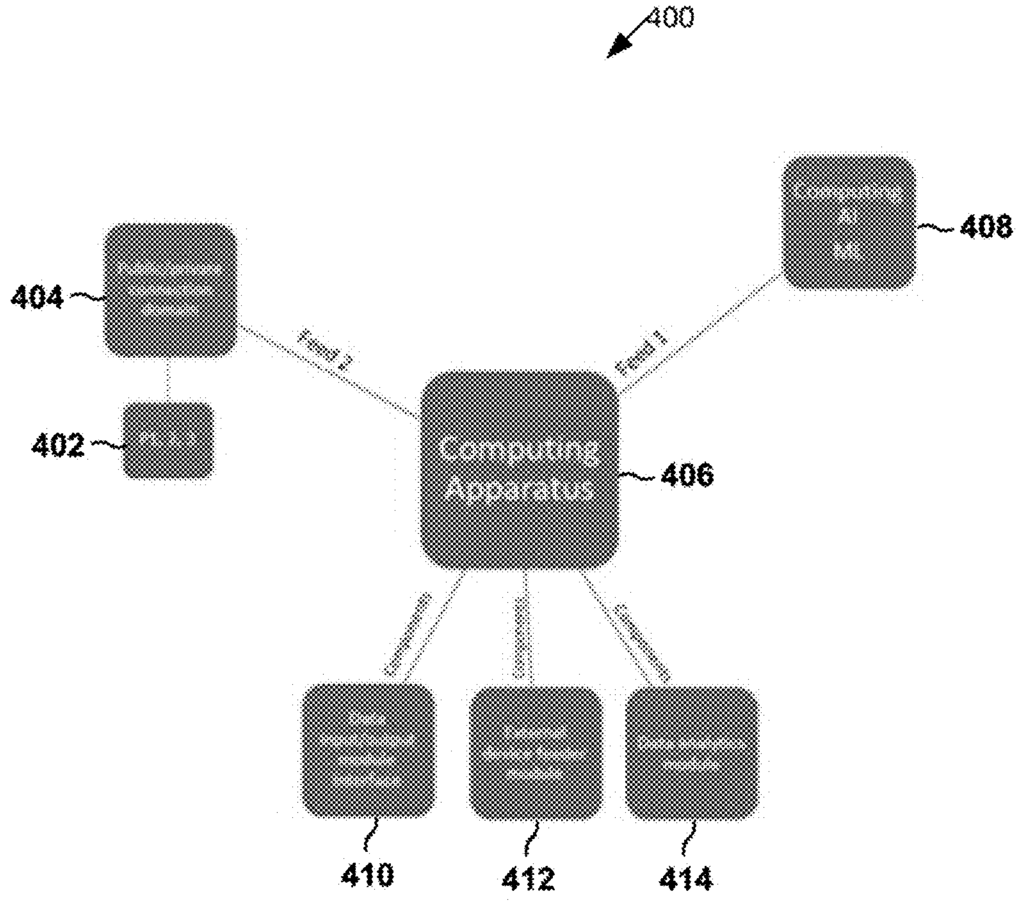
FIG. 4 is an example of a computer apparatus ecosystem.

FIG. 4 is an example of a computer apparatus ecosystem 400. The ecosystem 400 includes public and private data sources 402, which can correspond to the public and private data sources, as shown in FIG. 1. Thus, reference can be made to one or more examples of FIGS. 1-3 in the example of FIG. 3. The ecosystem 400 includes connections 404 to the data sources 402. The ecosystem 400 includes a computing apparatus 406, such as the computing apparatus 302, as shown in FIG. 1. The computing apparatus 406 is fed with first and second feeds, identified as "Feed 1" and "Feed 2" in FIG. 4, respectively. The first feed corresponds to the AI/ML model 408 of the invention, whereas the second feed corresponds to the connections 404 for the data source 402. The ecosystem 400 includes a data input/output module interface 410, an external device feeder module 412, and a data analytics module 414 similar or same to the ones, as described herein, and which can be used in providing a report and/or advisory.

Figure 5:
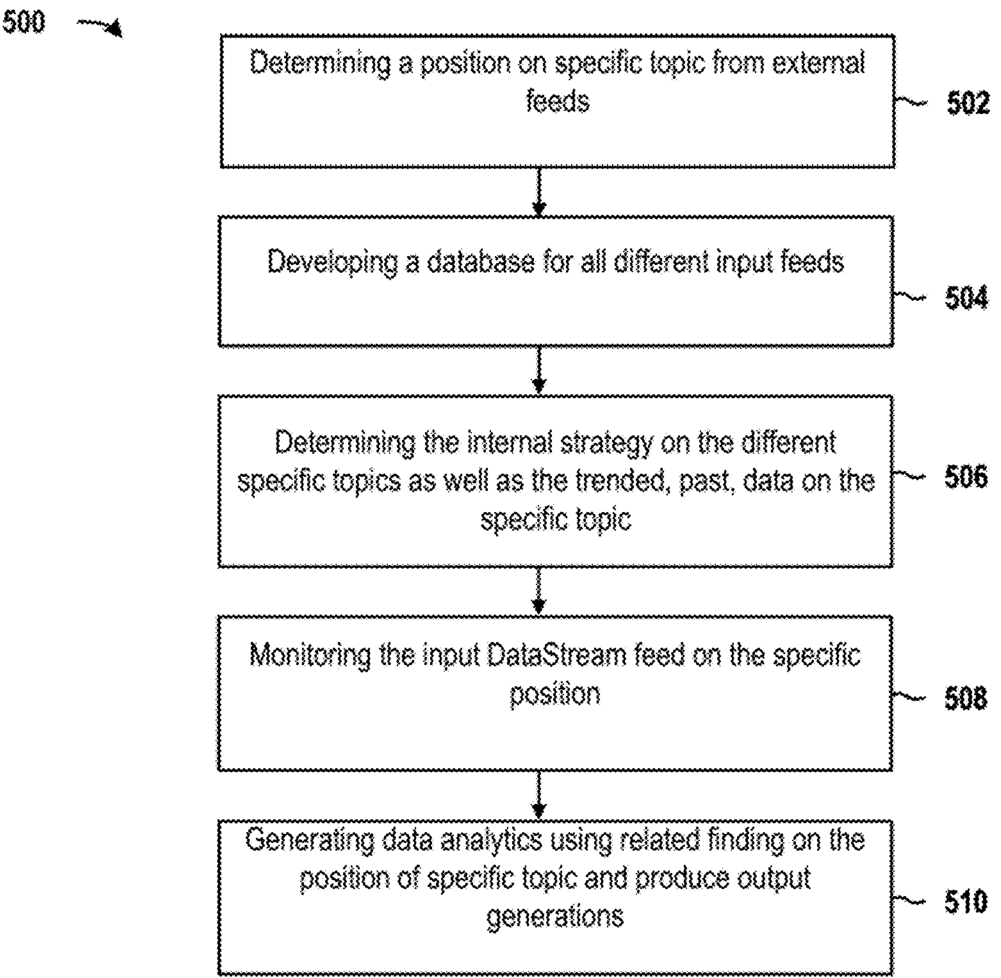
FIGS. 5-6 is an example of a method for providing a recommendation.
Figure 6:
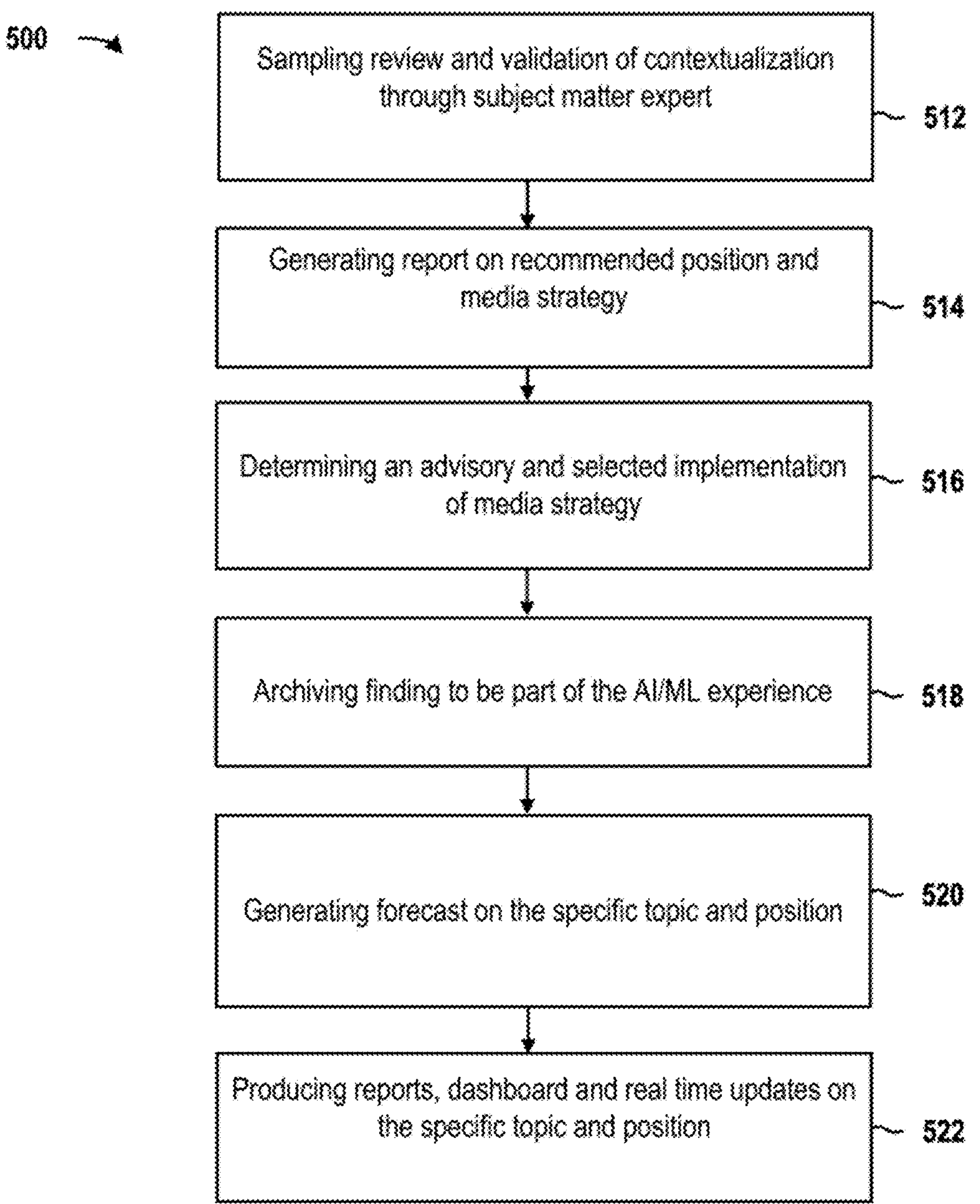

In view of the foregoing structural and functional features described above, an example(s) method will be better appreciated with reference to FIGS. 5-6. While, for purposes of simplicity of explanation, the example method of FIGS. 5-6 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the method.

FIGS. 5-6 is an example of a method 500 for providing a recommendation. The method 500 can be implemented by the system 100, as shown in FIG. 1. Thus, reference can be made to one or more examples of FIGS. 1-4 in the example of FIG. 5. One or more steps of the method 500 can be implemented by one of the systems, such as the system 100, as disclosed herein. Thus, reference can be made to one or more examples of FIGS. 1-4 in the example of FIGS. 5-6. The method 500 can begin at 502 by determining a position on a specific topic from external feeds. At 504, the database can be developed for all different input feeds. At 506, the internal strategy on the different specific topics as well as the trended, past, data on the specific topic can be determined. At 508, the input data stream on a specific position can be monitored. At 510, data analytics using related findings on the position of specific topics can be generated to produce output generations. At 512, sample and review and validation of contextualization through the SME can be implemented. At 514, generating a report on recommended position and media strategy. At 516, determining an advisory and selected implementation of media strategy. At 518, archiving a finding to be part of the AI/ML experience. At 520, generating a forecast on the specific topic and position. At 522, producing reports, dashboard, and real time updates on the specific topic and position.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 7. Thus, reference can be made to one or more examples of FIGS. 1-6 in the example of FIG. 7.

Figure 7:
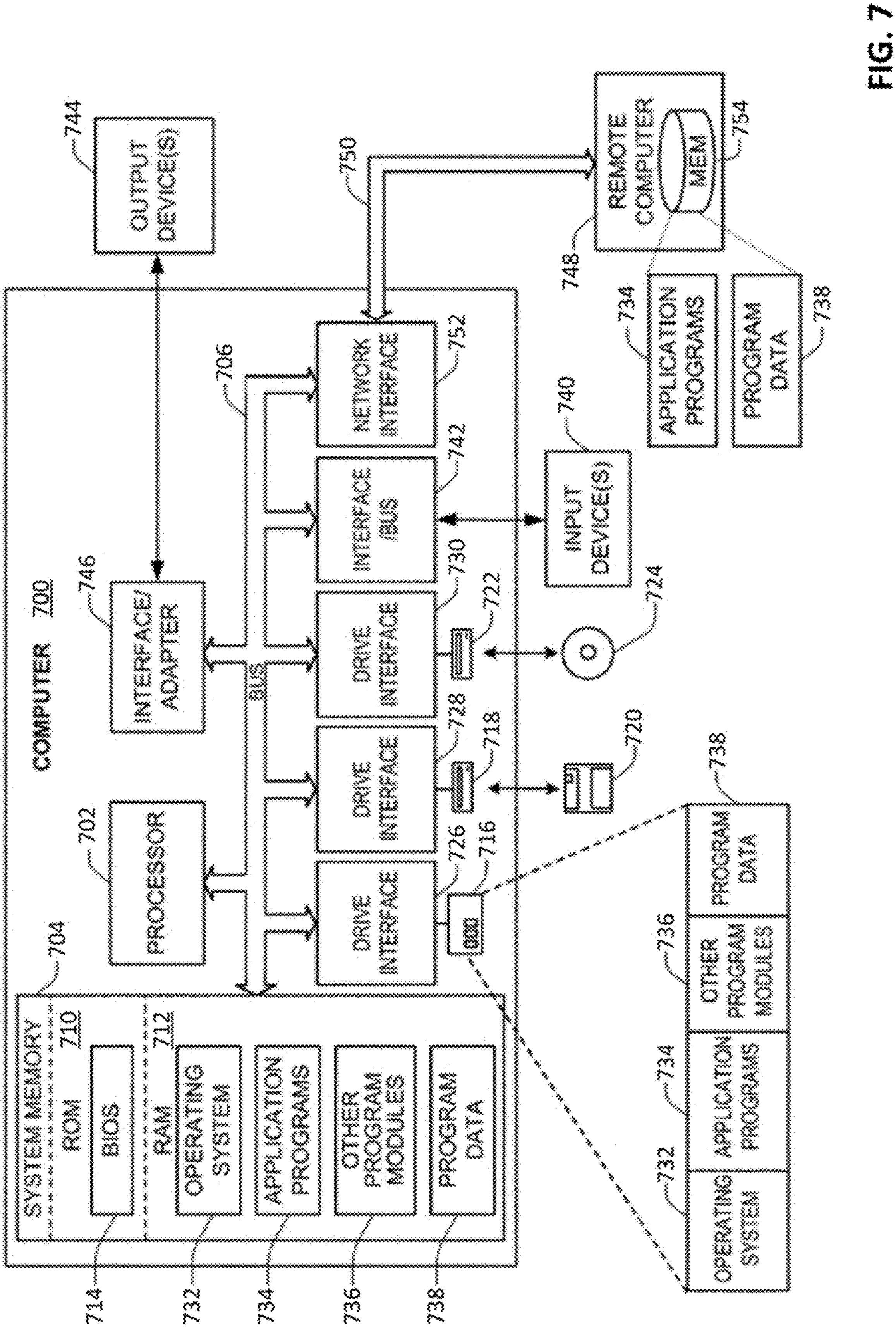
FIG. 7 depicts an example computing environment that can be used to perform methods according to an aspect of the present disclosure.

In this regard, FIG. 7 illustrates one example of a computer system 700 that can be employed to execute one or more embodiments of the present disclosure. Computer system 700 can be implemented on one or more general purpose networked computer systems, embedded computer systems, routers, switches, server devices, client devices, various intermediate devices/nodes or standalone computer systems. Additionally, computer system 700 can be implemented on various mobile clients such as, for example, a personal digital assistant (PDA), laptop computer, pager, and the like, provided it includes sufficient processing capabilities.

Computer system 700 includes processing unit 702, system memory 704, and system bus 706 that couples various system components, including the system memory 704, to processing unit 702. Dual microprocessors and other multiprocessor architectures also can be used as processing unit 702. System bus 706 may be any of several types of bus structure including a memory bus or memory controller, a peripheral bus, and a local bus using any of a variety of bus architectures. System memory 704 includes read only memory (ROM) 710 and random access memory (RAM) 712. A basic input/output system (BIOS) 714 can reside in ROM 712 containing the basic routines that help to transfer information among elements within computer system 700.

Computer system 700 can include a hard disk drive 716, magnetic disk drive 718, e.g., to read from or write to removable disk 720, and an optical disk drive 722, e.g., for reading CD-ROM disk 724 or to read from or write to other optical media. Hard disk drive 716, magnetic disk drive 718, and optical disk drive 722 are connected to system bus 706 by a hard disk drive interface 726, a magnetic disk drive interface 728, and an optical drive interface 730, respectively. The drives and associated computer-readable media provide nonvolatile storage of data, data structures, and computer-executable instructions for computer system 700. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and disclosed herein. A number of program modules may be stored in drives and RAM 710, including operating system 732, one or more application programs 734, other program modules 736, and program data 738. In some examples, the application programs 734 can include one or more modules (or block diagrams), or systems, as shown and disclosed herein. Thus, in some examples, the application programs 734 can include the system 100, as shown in FIG. 1.

A user may enter commands and information into computer system 700 through one or more input devices 740, such as a pointing device (e.g., a mouse, touch screen), keyboard, microphone, joystick, game pad, scanner, and the like. These and other input devices are often connected to processing unit 702 through a corresponding port interface 742 that is coupled to the system bus, but may be connected by other interfaces, such as a parallel port, serial port, or universal serial bus (USB). One or more output devices 744 (e.g., display, a monitor, printer, projector, or other type of displaying device) is also connected to system bus 706 via interface 746, such as a video adapter.

Computer system 700 may operate in a networked environment using logical connections to one or more remote computers, such as remote computer 748. Remote computer 748 may be a workstation, computer system, router, peer device, or other common network node, and typically includes many or all the elements described relative to computer system 700. The logical connections, schematically indicated at 750, can include a local area network (LAN) and a wide area network (WAN). When used in a LAN networking environment, computer system 700 can be connected to the local network through a network interface or adapter 752. When used in a WAN networking environment, computer system 700 can include a modem, or can be connected to a communications server on the LAN. The modem, which may be internal or external, can be connected to system bus 706 via an appropriate port interface. In a networked environment, application programs 734 or program data 738 depicted relative to computer system 700, or portions thereof, may be stored in a remote memory storage device 754.

Although this disclosure includes a detailed description on a computing platform and/or computer, implementation of the teachings recited herein are not limited to only such computing platforms. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models (e.g., software as a service (Saas, platform as a service (PaaS), and/or infrastructure as a service (IaaS)) and at least four deployment models (e.g., private cloud, community cloud, public cloud, and/or hybrid cloud). A cloud computing environment can be service oriented with a focus on statelessness, low coupling, modularity, and semantic interoperability.

Figure 8:
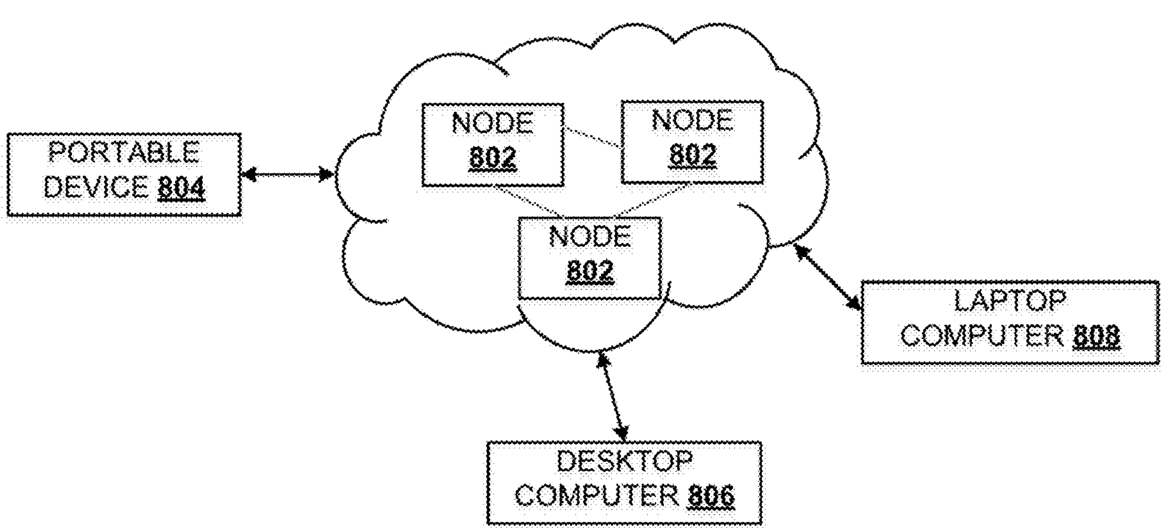
FIG. 8 depicts a cloud computing environment that can be used to perform one or more actions according to an aspect of the present disclosure.

FIG. 8 is an example of a cloud computing environment 800 that can be used for implementing one or more modules and/or systems in accordance with one or more examples, as disclosed herein. Thus, reference can be made to one or more examples of FIGS. 1-7 in the example of FIG. 8. As shown, cloud computing environment 800 can include one or more cloud computing nodes 802 with which local computing devices used by cloud consumers (or users), such as, for example, personal digital assistant (PDA), cellular, or portable device 804, a desktop computer 806, and/or a laptop computer 808, may communicate. The computing nodes 802 can communicate with one another. In some examples, the computing nodes 802 can be grouped (not shown) physically or virtually, in one or more networks, such as Private, Community, Public, or Hybrid clouds, or a combination thereof. This allows the cloud computing environment 800 to offer infrastructure, platforms and/or software as services for which a cloud consumer does not need to maintain resources on a local computing device. The devices 804-808, as shown in FIG. 8, are intended to be illustrative and that computing nodes 802 and cloud computing environment 800 can communicate with any type of computerized device over any type of network and/or network addressable connection (e.g., using a web browser). In some examples, the one or more computing nodes 802 are used for implementing one or more examples disclosed herein. Thus, in some examples, the one or more computing nodes can be used to implement modules, platforms, and/or systems, as disclosed herein.

In some examples, the cloud computing environment 800 can provide one or more functional abstraction layers. It is to be understood that the cloud computing environment 800 need not provide all of the one or more functional abstraction layers (and corresponding functions and/or components), as disclosed herein. For example, the cloud computing environment 800 can provide a hardware and software layer that can include hardware and software components. Examples of hardware components include: mainframes; RISC (Reduced Instruction Set Computer) architecture based servers; servers; blade servers; storage devices; and networks and networking components. In some embodiments, software components include network application server software and database software.

In some examples, the cloud computing environment 800 can provide a virtualization layer that provides an abstraction layer from which the following examples of virtual entities may be provided: virtual servers; virtual storage; virtual networks, including virtual private networks; virtual applications and operating systems; and virtual clients. In some examples, the cloud computing environment 800 can provide a management layer that can provide the functions described below. For example, the management layer can provide resource provisioning that can provide dynamic procurement of computing resources and other resources that are utilized to perform tasks within the cloud computing environment. The management layer can also provide metering and pricing to provide cost tracking as resources are utilized within the cloud computing environment 800, and billing or invoicing for consumption of these resources. In one example, these resources may include application software licenses. Security provides identity verification for cloud consumers and tasks, as well as protection for data and other resources. The management layer can also provide a user portal that provides access to the cloud computing environment 800 for consumers and system administrators. The management layer can also provide service level management, which can provide cloud computing resource allocation and management such that required service levels are met. Service Level Agreement (SLA) planning and fulfillment can also be provided to provide pre-arrangement for, and procurement of, cloud computing resources for which a future requirement is anticipated in accordance with an SLA.

In some examples, the cloud computing environment 800 can provide a workloads layer that provides examples of functionality for which the cloud computing environment 800 may be utilized. Examples of workloads and functions which may be provided from this layer include: mapping and navigation; software development and lifecycle management; virtual classroom education delivery; data analytics processing; and transaction processing. Various embodiments of the present disclosure can utilize the cloud computing environment 800.

The present disclosure is also directed to the following exemplary embodiments, which can be practiced in any combination thereof:

Embodiment A: a computer-implemented method for providing media intelligence for a company relating to a topic and/or theme comprising: receiving media intelligence parameter data and company historical data; generating a subject search parameter based on the media intelligence parameter data and the company historical data, the subject search parameter including one or more phrases, words, sentences, and/or categories for the topic and/or theme; querying data for the topic and/or theme from a number of private and/or media data sources based on the subject search parameter; aggregating the queried data to to provide aggregated data; filtering the aggregated data to provide filtered data, the filtered data indicating a position of the private and/or media data sources on the topic and/or theme; and providing a recommendation for the topic and/or theme in response to processing the filtered data through an ML model.

Embodiment B: a system for providing media intelligence for a company for a topic and/or theme comprising: one or more computing platforms configured to: receive media data from a media data source based on subject search parameter and private data from a private data source, the subject search parameter including one or more phrases, words, sentences, and/or categories for the topic and/or theme; aggregate the media data and the private data to provide aggregated data; filter the aggregated data to provide filtered data, the filtered data indicating a position of the media data sources and the private data source on the topic and/or theme; provide a recommendation relating to the media intelligence for the topic and/or theme by processing the filtered data through an ML model; and causing a process and/or system of a company to be adjusted based on the provided recommendation to adjust a hydrocarbon production.

Embodiment C: a system for providing media intelligence for a company for a topic and/or theme comprising: memory to store machine-readable instructions; and one or more processors to access the memory and execute the machine-readable instructions, the machine readable instructions comprising: a first natural language processing (NLP) model to provide a subject search parameter, the subject search parameter identifying one or more phrases, words, sentences, and/or categories for the topic and/or theme associated with a sector; a system interface to aggregate data for the topic and/or theme from a number of different of media data sources and private data sources to provide aggregated data; a second NLP model to filter the aggregated data to provide filtered data, the filtered data indicating a position of the private and media data sources on the topic and/or theme; and an ML model to process the filtered data to provide a recommendation relating to the media intelligence for the topic and/or theme.

Each of embodiments A through C may have one or more of the following additional elements in any combination: Embodiment 1: wherein the media intelligence parameter data identifies one or more parameters for controlling a type of recommendation that is provided as the recommendation by the ML model; Embodiment 2: wherein the company historical data comprises past advisories, reports, strategic documents white papers, and/or other publications related to the theme and/or topic; Embodiment 3: wherein said generating comprises using text mining techniques to extract keywords, phrases, and/or sentences from the company historical data; Embodiment: 4: wherein the text mining techniques uses an NLP model trained to identify the keywords, phrases, and/or sentences from the company historical data relevant to the theme and/or topic; Embodiment 5: wherein the NLP model is a first model, and said filtering comprises using a second NLP to process the aggregated data to provide the filtered data; Embodiment 6: wherein filtered data 132 comprises information characterizing a view point, facts, statistics, regulation, share of voice (SOV), and media sentiment relating to the topic and/or theme; Embodiment 7: further comprising validating using an external system the filtered data to confirm whether the filtered data is valid; Embodiment 8: wherein said validating comprising checking a context, a source credibility, and relevance of the filtered data; Embodiment 9: further comprising storing the filtered data in a database and the ML is to retrieve the filtered data from the database for processing to provide the recommendation; Embodiment 10: further comprising receiving user data for the topic and/or theme, the user data being provided via an input device and being stored as part of the filtered data; Embodiment 11: wherein said providing comprises generating a report with the recommendation and information from the filtered data; Embodiment 12: further comprising receiving data indicative of the theme and/or topic from a user; Embodiment 13: wherein the one or more computing platforms are configured to generate the subject search parameter based on media intelligence parameter data and company historical data; Embodiment 14: wherein the the one or more computing platforms are configured to validate using an external system the filtered data to confirm whether the filtered data is valid; Embodiment 15: wherein the ML model is a supervised ML model trained based on labelled data and historical data; Embodiment 16: wherein the the machine readable instructions further comprise a user interface to receive user data for the topic and/or theme, the user data being stored as part of the filtered data; and Embodiment 17: wherein the the machine readable instructions further comprise a report generator to provide a report with the recommendation and information from the filtered data.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The term "based on" means "based at least in part on." The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 5-10% of the indicated number.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The invention claimed is:

1. A computer-implemented method for providing media intelligence for a company relating to a topic and/or theme comprising:

receiving media intelligence parameter data and company historical data;

generating a subject search parameter based on the media intelligence parameter data and the company historical data, the subject search parameter including one or more phrases, words, sentences, and/or categories for the topic and/or theme;

establishing a baseline media trend for the topic and/or theme from historical media data from a prior time period, the baseline media trend representing sentiment patterns over the prior time period;

querying data for the topic and/or theme from a number of private and/or media data sources based on the subject search parameter;

aggregating the queried data to provide aggregated data;

filtering the aggregated data to provide filtered data, the filtered data representing current media coverage indicating a position of the private and/or media data sources on the topic and/or theme;

comparing the filtered data against the baseline media trend to identify deviations; and providing a recommendation for the topic and/or theme in response to processing the filtered data and the identified deviations through a machine learning (ML) model, wherein the recommendation is based on a magnitude and direction of the identified deviations and specifies a responsive action proportional to the magnitude of the identified deviations.

2. The computer-implemented method of claim 1, wherein the media intelligence parameter data identifies one or more parameters for controlling a type of recommendation that is provided as the recommendation by the ML model.

3. The computer-implemented method of claim 1, wherein the company historical data comprises past advisories, reports, strategic documents white papers, and/or other publications related to the theme and/or topic.

4. The computer-implemented method of claim 3, wherein said generating comprises using text mining techniques to extract keywords, phrases, and/or sentences from the company historical data.

5. The computer-implemented method of claim 4, wherein the text mining techniques uses a natural language processing (NLP) model trained to identify the keywords, phrases, and/or sentences from the company historical data relevant to the theme and/or topic.

6. The computer-implemented method of claim 5, wherein the NLP model is a first model, and said filtering comprises using a second NLP to process the aggregated data to provide the filtered data.

7. The computer-implemented method of claim 6, wherein filtered data 132 comprises information characterizing a view point, facts, statistics, regulation, share of voice (SOV), and media sentiment relating to the topic and/or theme.

8. The computer-implemented method of claim 1, further comprising validating using an external system the filtered data to confirm whether the filtered data is valid.

9. The computer-implemented method of claim 8, wherein said validating comprising checking a context, a source credibility, and relevance of the filtered data.

10. The computer-implemented method of claim 1, further comprising storing the filtered data in a database and the ML is to retrieve the filtered data from the database for processing to provide the recommendation.

11. The computer-implemented method of claim 10, further comprising receiving user data for the topic and/or theme, the user data being provided via an input device and being stored as part of the filtered data.

12. The computer-implemented method of claim 1, wherein said providing comprises generating a report with the recommendation and information from the filtered data.

13. The computer-implemented method of claim 1, further comprising receiving data indicative of the theme and/or topic from a user.

14. A system for providing media intelligence for a company for a topic and/or theme comprising:

one or more computing platforms each comprising:

memory to store machine-readable instructions;

one or more processors to access the memory and execute the machine-readable instructions, the machine readable instructions configured to:

receive media data from a media data source based on subject search parameter and private data from a private data source, the subject search parameter including one or more phrases, words, sentences, and/or categories for the topic and/or theme;

establishing a baseline media trend for the topic and/or theme from historical media data from a prior time period, the baseline media trend representing sentiment patterns over the prior time period;

aggregate the media data and the private data to provide aggregated data;

filter the aggregated data to provide filtered data, the filtered data representing current media coverage indicating a position of the media data sources and the private data source on the topic and/or theme;

comparing the filtered data against the baseline media trend to identify deviations;

provide a recommendation relating to the media intelligence for the topic and/or theme by processing the filtered data and the identified deviations through a machine learning (ML) model, wherein the recommendation is based on a magnitude and direction of the identified deviations and specifies a responsive action proportional to the magnitude of the identified deviations; and cause a process and/or system of a company to be adjusted based on the provided recommendation to adjust a hydrocarbon production.

15. The system of claim 14, wherein the one or more computing platforms are configured to generate the subject search parameter based on media intelligence parameter data and company historical data.

16. The system of claim 14, wherein the one or more computing platforms are configured to validate using an external system the filtered data to confirm whether the filtered data is valid.

17. The system of claim 14, wherein the ML model is a supervised ML model trained based on labelled data and historical data.

18. A system for providing media intelligence for a company for a topic and/or theme comprising:

memory to store machine-readable instructions;

one or more processors to access the memory and execute the machine-readable instructions, the machine readable instructions comprising:

a first natural language processing (NLP) model to provide a subject search parameter, the subject search parameter identifying one or more phrases, words, sentences, and/or categories for the topic and/or theme associated with a sector;

a system interface to aggregate data for the topic and/or theme from a number of different of media data sources and private data sources to provide aggregated data;

a second NLP model to filter the aggregated data to provide filtered data, the filtered data representing current media coverage indicating a position of the private and media data sources on the topic and/or theme;

an analytics engine to:

establish a baseline media trend for the topic and/or theme from historical media data from a prior time period, the baseline media trend representing sentiment patterns over the prior time period; and compare the filtered data against the baseline media trend to identify deviations; and a machine learning (ML) model to process the filtered data and the identified deviations to provide a recommendation relating to the media intelligence for the topic and/or theme, wherein the recommendation is based on the magnitude and direction of the identified deviations and specifies a responsive action proportional to the magnitude of the identified deviations.

19. The system of claim 18, wherein the machine readable instructions further comprise a user interface to receive user data for the topic and/or theme, the user data being stored as part of the filtered data.

20. The system of claim 18, wherein the machine readable instructions further comprise a report generator to provide a report with the recommendation and information from the filtered data.

* * * * *